(12) United States Patent
Tacchetti et al.

(10) Patent No.: US 11,250,475 B2
(45) Date of Patent: Feb. 15, 2022

(54) NEURAL NETWORK ARCHITECTURE FOR EFFICIENT RESOURCE ALLOCATION

(71) Applicant: DeepMind Technologies Limited, London (GB)

(72) Inventors: Andrea Tacchetti, London (GB); Daniel Joseph Strouse, London (GB); Marta Garnelo Abellanas, London (GB); Thore Kurt Hartwig Graepel, Cambridge (GB); Yoram Bachrach, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/918,805

(22) Filed: Jul. 1, 2020

(65) Prior Publication Data
US 2022/0005079 A1 Jan. 6, 2022

(51) Int. Cl.
*G06Q 30/02* (2012.01)
*G06N 3/04* (2006.01)
*G06N 3/02* (2006.01)
*G10L 25/30* (2013.01)
*G06K 9/28* (2006.01)

(52) U.S. Cl.
CPC ........... *G06Q 30/0274* (2013.01); *G06N 3/04* (2013.01); *G06Q 30/0275* (2013.01)

(58) Field of Classification Search
CPC .. G06Q 30/0274; G06Q 30/0275; G06N 3/04; G06N 3/02; G10L 25/30; G06F 17/2765; G06K 9/4628
See application file for complete search history.

(56) References Cited

U.S. PATENT DOCUMENTS

2012/0116860 A1* 5/2012 Slivkins ............. G06Q 30/0234
705/14.34
2012/0323674 A1* 12/2012 Simmons ........... G06Q 30/0249
705/14.41

(Continued)

OTHER PUBLICATIONS

Comparative Evaluation of Algorithms for Auction Based Cloud Pricing Prediction; Sara Arevalos, Fabio Lopez-Pires, and Benjamin Baran (Year: 2016).*

(Continued)

*Primary Examiner* — Victoria E Frunzi
(74) *Attorney, Agent, or Firm* — Fish & Richardson P.C.

(57) ABSTRACT

Methods, systems, and apparatus, including computer programs encoded on a computer storage medium, for efficiently allocating resources among participants. Methods can include receiving valuation data specifying, for each of a plurality of entities, a respective valuation for each of a plurality of resource subsets, each resource subset comprising a different combination of one or more resources of a plurality of resources. After receiving valuation data, assigning each resource in the plurality of resources to a respective entity of the plurality of entities based on the valuations and generating, for each particular entity, a respective input representation that is derived from valuations of every other entity in the plurality of entities other than the particular entity. The input representation for each particular entity is processed using a neural network to generate a rule for the particular entity and a payment based on the rule output for the entities.

11 Claims, 4 Drawing Sheets

(56) References Cited

U.S. PATENT DOCUMENTS

| | | | |
|---|---|---|---|
| 2018/0018553 A1* | 1/2018 | Bach | G06K 9/4628 |
| 2019/0236450 A1* | 8/2019 | Li | G06N 3/0445 |

OTHER PUBLICATIONS

The Application of Convolutional Neural Networks in Bidding Price Estimation Decision; Zhou Ying (Year: 2018).*

Ausubel et al., "The lovely but lonely Vickrey auction," Combinatorial Auctions, 2006, 17:22-26.

Bajari et al., "The winner's curse, reserve prices, and endogenous entry: Empirical insights from eBay auctions," RAND Journal of Economics. 2003, 34(2):329-355.

Battaglia et al., "Relational inductive biases, deep learning, and graph networks," CoRR, Jun. 2018, arxiv.org/abs/1806.01261, 40 pages.

Bulow et al., "The simple economics of optimal auctions," Journal of Political Economy, 1989, 97(5):1060-1090.

Clarke, "Multipart pricing of public goods," Public Choice, 1971, 11(1):17-33.

Conitzer et al., "Complexity of mechanism design," CoRR, May 2002, arxiv.org/abs/cs/0205075, 8 pages.

Conitzer et al., "Self-interested automated mechanism design and implications for optimal combinatorial auctions," Proceedings of the 5th ACM Conference on Electronic Commerce, May 2004, pp. 132-141.

Cramton et al., "The FCC spectrum auctions: An early assessment," Journal of Economics & Management Strategy, 1997, 6(3):431-495.

Dütting et al., "Optimal auctions through deep learning," Proceedings of the 36th International Conference on Machine Learning, 2019, 97:1706-1715.

Edelman et al., "Internet advertising and the generalized second-price auction: Selling billions of dollars' worth of keywords," American Economic Review, 2007, 97(1):242-259.

Feng et al., "Deep learning for revenue-optimal auctions with budgets," Proceedings of the 17th International Conference on Autonomous Agents and MultiAgent Systems, 2018, pp. 354-362.

Green et al., "Characterization of Satisfactory Mechanisms for the Revelation of Preferences for Public Goods," Econometrica, Mar. 1997, 45(2):427-438.

Groves, "Incentives in Teams," Econometrica, Jul. 1973, 41(4):617-631.

Guo et al,. "Computationally feasible automated mechanism design: General approach and case studies," Twenty-Fourth AAAI Conference on Artificial Intelligence. 2010. 10:4 pages.

Guo et al., "Optimal-in-expectation redistribution mechanisms," Artificial Intelligence, Apr. 2010, 174(5-6):363-381.

Hajiaghayi et al., "Automated online mechanism design and prophet inequalities," Twenty-First AAAI Conference on Artificial Intelligence, Jul. 2007, 7:58-65.

Hartford et al., "Deep learning for predicting human strategic behavior," Advances in Neural Information Processing Systems 29, 2016, pp. 2424-2432.

Kingma et al, "Adam: A method for stochastic optimization," CoRR, Dec. 2014, arxiv.org/abs/1412.6980, 15 pages.

LeCun et al., "Convolutional networks for images, speech, and time series," The Handbook of Brain Theory and Neural Networks, 1995, pp. 255-258.

Manisha et al., "Learning optimal redistribution mechanisms through neural networks," CoRR, Jan. 2018, arxiv.org/abs/1801.08808, 9 pages.

Myerson et al., "Optimal auction design," Mathematics of Operations Research, Feb. 1991, 6(1):58-73.

Nisan et al., "Algorithmic Mechanism Design," Games and Economic Behavior, Apr. 2001, 35(1-2):166-196.

Nisan et al., "Bidding and allocation in combinatorial auctions," Proceedings of the Second ACM Conference on Electronic Commerce, Oct. 2000, pp. 1-12.

Parkes et al., "Economic reasoning and artificial intelligence," Science, Jul. 2015, 349(6245):267-272.

Parkes, "Iterative Combinatorial Auctions: Achieving Economic and Computational Efficiency," Thesis for the degree of Doctor of Philosophy, University of Pennsylvania, Computer and Information Science, 2001, 346 pages.

Roth, "The economist as engineer: Game theory, experimentation, and computation as tools for design economics," Econometrica, Dec. 2003, 70(4): 1341-1378.

Sandholm, "Automated mechanism design: A new application area for search algorithms," International Conference on Principles and Practice of Constraint Programming, 2003, pp. 19-36.

Tacchetti et al., "A Neural Architecture for Designing Truthful and Efficient Auctions," CoRR, Jul. 2019, arxiv.org/abs/1907.05181, 15 pages.

Varian et al., "The VCG auction in theory and practice," American Economic Review, May 2014, 104(5):442-45.

Vickrey et al., "Counterspeculation, auctions, and competitive sealed tenders," The Journal of Finance, Mar. 1961, 16(1):8-37.

Vries et al., "Combinatorial auctions: A survey," INFORMS Journal on Computing, Aug. 2003, 15(3):284-309.

Zaheer et al., "Deep sets," Advances in Neural Information Processing Systems 30, 2017, pp. 3391-3401.

* cited by examiner

NEURAL NETWORK ARCHITECTURE FOR EFFICIENT RESOURCE ALLOCATION

BACKGROUND

This specification relates to neural networks.

In particular this specification relates to a neural network architecture for efficiently allocating resources among participants.

In general, neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in methods of receiving valuation data specifying, for each of a plurality of entities, a respective valuation for each of a plurality of resource subsets, each resource subset comprising a different combination of one or more resources of a plurality of resources; assigning each resource in the plurality of resources to a respective entity of the plurality of entities based on the valuations; generating, for each particular entity of the plurality of entities, a respective input representation that is derived from valuations of every other entity in the plurality of entities other than the particular entity; processing, for each particular entity of the plurality of entities, the input representation using a neural network to generate a rule for the particular entity and determining, for each of the entities, a payment based on the rule output for the entities.

Other embodiments of this aspect include corresponding methods, apparatus, and computer programs, configured to perform the actions of the methods, encoded on computer storage devices. These and other embodiments can each optionally include one or more of the following features.

Methods can further include determining, for each of the entities, a payment that includes determining the payment based on the payment rule and the optimal allocation of the resources wherein the rule is a payment rule.

Methods can include determining, for each of the entities, a payment that includes determining a VCG payment for the entity and subtracting the payment rule from the VCG payment wherein the rule is a redistribution rule based on the valuations of the resources by the entities.

Methods can include generating, for each particular entity of the plurality of entities, the respective input representation that includes a plurality of channels, the plurality of channels comprising a first channel that includes the respective valuations for the other entities other than the particular entity wherein the plurality of channels further includes a respective set of channels for each of a plurality of combinations of one or more resource subsets, the set of channels for each of the combinations including an assignment channel that indicates which of the other entities is assigned the resource subsets in the combination when the valuations of the particular entity are not considered and wherein the set of channels for each of the combinations includes a utility channel that indicates a realized value to the other entities when the resource subsets in the combination are assigned without considering the valuations of the particular entity.

Methods can include processing, for each particular entity of the plurality of entities, the input representation using a neural network wherein the neural network includes one or more convolutional layers that are configured to process the input representation for the particular entity and to generate a first per-entity representation of preferences of each of the other entities and wherein the neural network includes one or more multi-layer perceptrons that are configured to process the first per-entity representation for the particular entity and to generate a second per-entity representation of preference of each of the other entities.

The methods can further include processing, for each particular entity of the plurality of entities, the input representation using a neural network wherein the neural network includes a sum-pooling operation configured to perform an element-wise summation of the second per-player representation of preference of each of the other entities to generate the final entity representation and wherein the neural network includes a decoder configured to receive as input the final entity representation and generate as output the payment rule outputs.

Particular embodiments of the subject matter described in this specification can be implemented to realize one or more of the following advantages. For example, the techniques discussed throughout this document can programmatically implement a resource allocation scheme and evaluate bids for resources from entities and allocate resources without a human in the loop. This allows resources to be allocated efficiently, while minimizing computational overhead and maximizing the benefits of the allocation to both the entities receiving the resources and the system allocating the resources. The details of one or more embodiments of the subject matter described in this specification are set forth in the accompanying drawings and the description below. Other features, aspects, and advantages of the subject matter will become apparent from the description, the drawings, and the claims.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
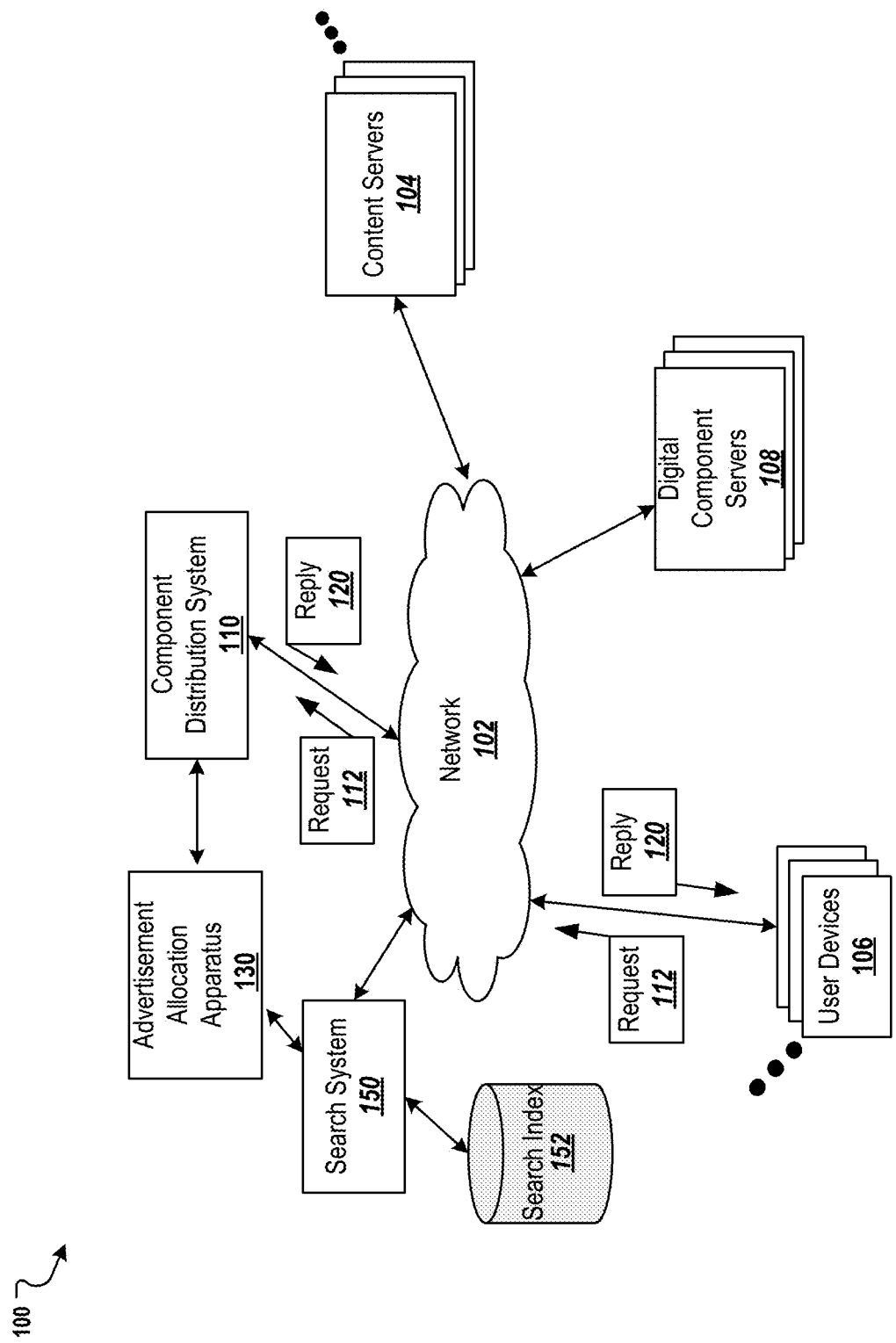
FIG. 1 is a block diagram of an example environment in which a resource allocation mechanism is implemented.

This specification discloses methods, systems, apparatus, and computer readable media that implements a deep learning based approach to automatically design truthful and efficient resource allocation mechanisms.

Embodiments of current invention can be implemented in an environment that requires an automatic implementation of a scheme for allocating resources among multiple entities.

For example, a content resource placement system, may need to display one or more content resources, e.g., advertisements, search results, or other content, that are relevant to a corresponding search request.

A wide variety of information is made available through the collection of billions of web pages that comprise the Internet. As there is no central index or single reference catalog for the Internet that classifies the information contained on a given web page or collection of web pages, locating a desired resource of information on the World Wide Web can be difficult. Additionally, because the content of a web page typically is controlled by the individual host, determining whether particular content is still available at a given location can be difficult.

Search engines, such as the engine provided by Google™, were developed to dynamically generate an index of web pages relating to a user defined search request. Typically, a user submits a search request to a search engine in the form of a search string comprising one or more keywords. In response to the submitted search string, the search engine generates a list of web pages that are believed to relate to the search request. Once generated, the list can be presented to the user through a graphical user interface (GUI), such as in a series of Uniform Resource Locators (URLs), graphical icons, titles, summaries, descriptions, or any combination thereof. The requesting user is then free to browse the list and select one or more links based on the description provided. If the list does not contain information for which the user was searching, the user can refine the initial search string through the use of additional and/or different keywords. The search engine can be configured to generate a list of web pages dynamically in response to each search request it receives.

In addition to returning a dynamically generated list of web pages, search engines often also display one or more advertisements in response to a search request. An advertisement is typically displayed such that it is viewable in conjunction with the search results. Similar to search results, an advertisement also can be selected for display based on the search string specified by the user. In such an advertising model, the advertisers bid on keywords and keyword combinations of the search query. A bid can be any offer of consideration, including an amount of money. Advertisers' bids for a particular keyword or keyword combination that can be evaluated when a corresponding search string is received and the advertisement belonging to the winning advertiser can be displayed. Depending on the advertising model, more than one winning advertiser can be selected for an instance and the advertisements provided by the winning advertisers can be displayed along with the search results.

Generally, the search results page has a sponsored search section including one or more slots where each slot can display one advertisement. In some implementations, each slot can be considered as identical to one another. In other implementations, each slot can be characterized by its position and visibility to the user there by making each slot different. In some implementations, the search engine/provider may wish to allocate the slots for ensuring a competitive market rather than maximizing its own profits. Such an allocation can be determined by resource allocations schemes, i.e., resource allocation mechanisms. Resource allocation mechanisms are protocols to allocate resources (advertisement slots) to entities (advertisers) who have preferences over them, and collect payment in return. Significant effort has gone in designing resource allocation mechanism rules that result in allocations of the goods that are desirable for the group as a whole. However, for settings where the entity's valuations of the resources on sale are their private information, misreporting their preferences so as to maximize their own utility hinders the ability of the auctioneer to allocate goods who want them the most. In such implementations, optimal allocation of resources among the entities can be achieved by resource allocation mechanism frameworks that motivate the entities to reveal their true valuation of the goods.

For example, a search provider may wish to allocate the scarce sponsored advertisement positions to the advertisers who value this resource the most. However, the true valuation of participating entities is only known by the particular advertiser, rather than to the search provider. Thus, the resource allocation mechanism design challenge for the search provider becomes: which prices should it charge in order to get truthful reports regarding advertiser's valuations, and optimally allocate the sponsored advertisement positions, while minimizing the economic burden on the advertisers.

To compute the optimal allocation k* of resources to the entities participating in the resource allocation mechanism, the resource allocation mechanism selects an allocation according to an allocation rule $$c : \underset{k \in K}{\operatorname{argmax}} \sum_{i}^{N} v_i(k) = k^*$$

where K consists of all possible ways to allocate the resources to the entities such that the allocation maximizes the sum of the total valuations of each allocated resources.

To make entities participate in the resource allocation mechanism with their true valuation of resources, the payment $t_i$ for the $i^{th}$ entity is defined as $$t_i(\theta_{-i}, \theta_i) = h(\theta_{-i}) - \sum_{j \neq i} v_j(k^*(\theta_{-i}, \theta_i))$$

where $\theta_{-i}$ is the valuation of k resources submitted by all other participants except the $i^{th}$ entity, the allocation k can be defined as the mapping of each entity to a set of resources, k* is the optimal allocation of resources to the entities and $h(\theta_{-i})$ is the payment rule that may be any function that only depends on the reported types of entities other than the $i^{th}$ such that $h : \theta_{-i} \to \mathbb{R}$.

FIG. 1 is a block diagram of an example environment in which resources are allocated.

The example environment 100 includes a network 102, such as a local area network (LAN), a wide area network (WAN), the Internet, or a combination thereof. The network 102 connects content servers 104, user devices 106, digital component servers 108, and a digital component distribution system 110 (also referred to as a component distribution system).

An electronic document is data that presents a set of content at a client device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to user devices 106 by content servers 104. For example, the content servers 104 can include servers that host publisher websites. In this example, the user device 106 can initiate a request for a given publisher webpage, and the content server 104 that hosts the given publisher webpage can respond to the request by sending machine executable instructions that initiate presentation of the given webpage at the client device 106.

In another example, the content servers 104 can include app servers from which user devices 106 can download apps. In this example, the user device 106 can download files required to install an app at the user device 106, and then execute the downloaded app locally. The app can present organic content, e.g., content specified by a developer of the app, and in some cases can also present one or more digital components (e.g., content created/distributed by a third party) that are obtained from a digital component server 108, and inserted into the app while the app is being executed at the user device 106. Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into the given electronic document to create a composite electronic document including the content obtained from the data source.

In some situations, a given electronic document can include a digital component tag or digital component script that references the digital component distribution system 110. In these situations, the digital component tag or digital component script is executed by the client device 106 when the given electronic document is processed by the user device 106. Execution of the digital component tag or digital component script configures the user device 106 to generate a request for digital components 112 (referred to as a "component request"), which is transmitted over the network 102 to the digital component distribution system 110. For example, the digital component tag or digital component script can enable the user device 106 to generate a packetized data request including a header and payload data. The component request 112 can include event data specifying features such as a name (or network location) of a server from which the digital component is being requested, a name (or network location) of the requesting device (e.g., the user device 106), and/or information that the digital component distribution system 110 can use to select one or more digital components provided in response to the request. The component request 112 is transmitted, by the user device 106, over the network 102 (e.g., a telecommunications network) to a server of the digital component distribution system 110.

The component request 112 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the digital component distribution system 110. Similarly, event data specifying keywords associated with the electronic document ("document keywords") or entities (e.g., people, places, or things) that are referenced by the electronic document can also be included in the component request 112 (e.g., as payload data) and provided to the digital component distribution system 110 to facilitate identification of digital components that are eligible for presentation with the electronic document. The event data can also include a search query that was submitted from the user device 106 to obtain a search results page, and/or data specifying search results and/or textual, audible, or other visual content that is included in the search results. Component requests 112 can also include event data related to other information, such as information that a user of the user device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The component distribution system 110, which includes one or more digital component distribution servers, chooses digital components that will be presented with the given electronic document in response to receiving the component request 112 and/or using information included in the component request 112. In some implementations, a digital component is selected in less than a second to avoid errors that could be caused by delayed selection of the digital component. For example, delays in providing digital components in response to a component request 112 can result in page load errors at the user device 106 or cause portions of the electronic document to remain unpopulated even after other portions of the electronic document are presented at the client device 106. Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided.

To facilitate searching of electronic documents, the environment 100 can include a search system 150 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 152 (e.g., hardware memory device(s)). Data that are associated with an electronic document is data that represents content included in the electronic document and/or metadata for the electronic document.

User devices 106 can submit search queries to the search system 150 over the network 102. In response, the search system 150 accesses the search index 152 to identify electronic documents that are relevant to the search query. The search system 150 identifies the electronic documents in the form of search results and returns the search results to the user device 106 in search results page. A search result is data generated by the search system 150 that identifies an electronic document that is responsive (e.g., relevant) to a particular search query, and includes an active link (e.g., hypertext link) that causes a client device to request data from a specified location in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the user device 106. Another example search result can include a title of streaming media, a snippet of text describing the streaming media, an image depicting contents of the streaming media, and/or a URL to a location from which the streaming media can be downloaded to the client device 106. Like other electronic documents search results pages can include one or more slots in which digital components (e.g., advertisements, video clips, audio clips, images, or other digital components) can be presented.

The environment 100 can further include an advertisement allocation apparatus 130 that implements a resource allocation mechanism to allocate the one or more slots (resources) to advertisers (entities) based on the search query and the result of the resource allocation mechanism. In some implementations, the resource allocation mechanism allocates resources to entities based on the bids received by the advertisement allocation apparatus 130 and then generates the payment for each of the entities that was allocated one or more resources. As described in more detail below, the advertisement allocation apparatus 130 receives bids from multiple entities for resources, allocates resources to entities and implements a deep neural network that determines the payment rule for each individual entity. The payment rule is further used to generate the payment for each entity that is allocated one or more resources.

Figure 2:
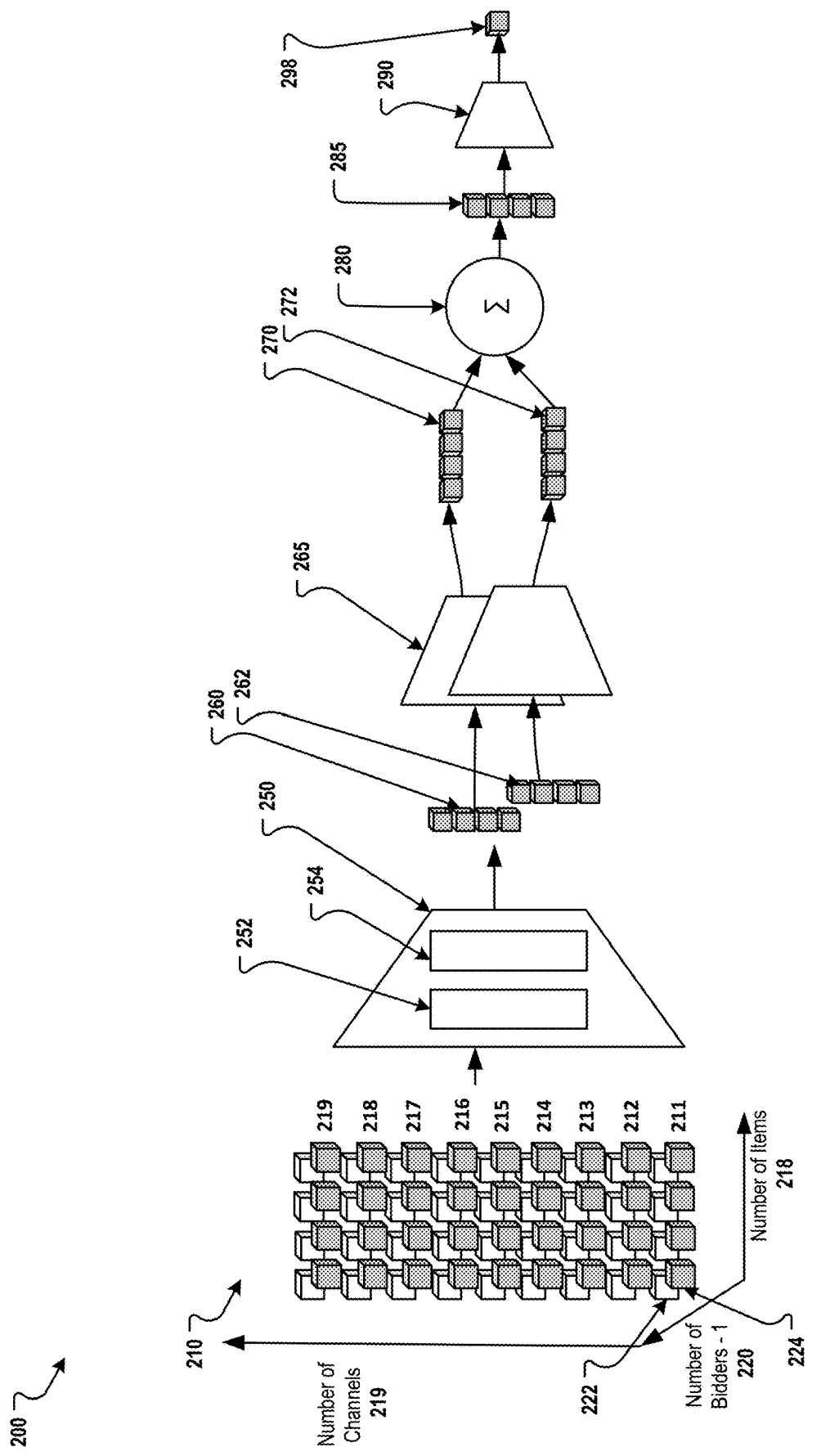
FIG. 2 is a block diagram of an example architecture of the neural network that implements a resource allocation mechanism with three entities and four resources.

FIG. 2 is an example neural network architecture 200 for three entities and four resources. To determine the payment rules for the three entities, each entity provides their individual bids for the resources.

When computing the payment rule for a particular entity, the bids of other entities are used to generate an input representation for the particular entity. For example, when computing payment rule for the second entity 223, the bids of the first entity 222 and the third entity 224 are used.

In some implementations, the input representation has a dimension of $|K| \times n-1 \times 2|K|+1$ where K is the number of resources for resource allocation mechanism, n is the number of entities and $2|K|+1$ is the number of channels based on the number of entities. For example, the input representation 110 for the case where there are three entities and four resources has nine channels 211-219 where each channel 211-219 has a dimensions 2×4.

In some implementations, each channel is a matrix of dimension $|K| \times (n-1)$ that represents information available about other entity's valuations for the resources for resource allocation mechanism while remaining within the Groves family of mechanisms. In one implementation, the first channel may comprise all bids from all entities (except for the particular entity) and for all bundles of resources wherein a bundle refers to any proper subset of resources in a resource allocation mechanism. Subsequent channels may be viewed as $|K|$ pairs where each pair has information regarding the proceeding bids for the resources. Within each pair comprising a first sub layer and a second sub layer, the first sub layer contains a one-hot encoding that represents resource allocation and the second sub layer contains the resulting realized valuation.

The input representation 210 is further explained with reference to tables 1-11. Table 1 represents a resource allocation mechanism between three entities 222, 223 and 224 for four resources where each row represents the value or the utility of bundles of resource for each of the three entities. For example, the valuation of one resource for entity 222 is 5, the valuation of the bundle comprising two resources is 9 and so on.

TABLE 1

|  | Entity 222 | Entity 223 | Entity 224 |
| --- | --- | --- | --- |
| Valuation of one resource | 5 | 7 | 3 |
| Valuation of two resources | 9 | 10 | 5 |
| Valuation of three resources | 13 | 12 | 6 |
| Valuation of four resources | 14 | 13 | 7 |

The input representation of the above mentioned resource allocation mechanism will comprise of nine channels wherein the first channel includes marginal valuations that represent the value of adding one resource to the bundle. Table 2 represents the marginal valuations of each individual entity. For example, entity 222 values one resource at 5 and values the second and the third resource at 4 and the fourth resource at 1 and so on.

TABLE 2

|  | Entity 222 | Entity 223 | Entity 224 |
| --- | --- | --- | --- |
| Marginal valuation of first resource | 5 | 7 | 3 |
| Marginal valuation of second resources | 4 | 3 | 2 |
| Marginal valuation of third resources | 4 | 2 | 1 |
| Marginal valuation of fourth resources | 1 | 1 | 1 |

While computing the payment rule for a particular entity, the bids of other entities are used to generate an input representation. For example, table 3 represents the first channel when computing payment rule for entity 223 with marginal valuations of entity 1 and 3.

TABLE 3

|  | Entity 222 | Entity 224 |
| --- | --- | --- |
| Marginal valuation of first resource | 5 | 3 |
| Marginal valuation of second resources | 4 | 2 |

TABLE 3-continued

|  | Entity 222 | Entity 224 |
|---|---|---|
| Marginal valuation of third resources | 4 | 1 |
| Marginal valuation of fourth resources | 1 | 1 |

The second channel contains information regarding allocation of the first resource using one hot encoding. The allocation is done based on bidding values of participants for the first resource. Table 4 represents the second channel with one hot encoding showing entity 222 was allocated the first resource since the valuation of the first resource for entity 222 is more than entity 224.

TABLE 4

|  | Entity 222 | Entity 224 |
|---|---|---|
| Winner of first resource | 1 | 0 |
| Winner of second resource | 0 | 0 |
| Winner of third resource | 0 | 0 |
| Winner of fourth resource | 0 | 0 |

The third channel contains information regarding the valuation realized by allocation the first resource obtained by element-wise multiplication of the first and the second channel. Table 5 represents the third channel.

TABLE 5

|  | Entity 222 | Entity 224 |
|---|---|---|
| Valuation allocating first resource | 5 | 0 |
| Valuation allocating second resource | 0 | 0 |
| Valuation allocating third resource | 0 | 0 |
| Valuation allocating fourth resource | 0 | 0 |

Similar to the second channel, the fourth channel shown in table 6, represents the information regarding allocation of the first and the second resource. The table shows that entity 222 was allocated the first and the second resource based on the marginal value of resources as seen in the first channel.

TABLE 6

|  | Entity 222 | Entity 224 |
|---|---|---|
| Winner of first resource | 1 | 0 |
| Winner of second resource | 1 | 0 |
| Winner of third resource | 0 | 0 |
| Winner of fourth resource | 0 | 0 |

The fifth channel shown in table 7 contains information about the valuation realized by allocating the first and the second resource obtained by element-wise multiplication of the first and the fourth channel.

TABLE 7

|  | Entity 222 | Entity 224 |
|---|---|---|
| Valuation allocating first resource | 5 | 0 |
| Valuation allocating second resource | 4 | 0 |

TABLE 7-continued

|  | Entity 222 | Entity 224 |
|---|---|---|
| Valuation allocating third resource | 0 | 0 |
| Valuation allocating fourth resource | 0 | 0 |

Similar to the second and the fourth channel, the sixth channel shown in table 8, represents the information regarding allocation of the first, second and the third resource. The table shows that entity 222 was allocated the first, second and third resources based on the marginal values of resources as seen in the first channel.

TABLE 8

|  | Entity 222 | Entity 224 |
|---|---|---|
| Winner of first resource | 1 | 0 |
| Winner of second resource | 1 | 0 |
| Winner of third resource | 1 | 0 |
| Winner of fourth resource | 0 | 0 |

The seventh channel shown in table 9 contains information about the valuation realized by allocating the first, second and third resources obtained by element-wise multiplication of the first and the sixth channel.

TABLE 9

|  | Entity 222 | Entity 224 |
|---|---|---|
| Valuation allocating first resource | 5 | 0 |
| Valuation allocating second resource | 4 | 0 |
| Valuation allocating third resource | 4 | 0 |
| Valuation allocating fourth resource | 0 | 0 |

The eighth channel shown in table 10, represents the information regarding allocation of the first, second, third and the fourth resource. The table shows that entity 222 was allocated the first, second and third resources and entity 224 was allocated the fourth resource based on the marginal value of resources as seen in the first channel.

TABLE 10

|  | Entity 222 | Entity 224 |
|---|---|---|
| Winner of first resource | 1 | 1 |
| Winner of second resource | 1 | 0 |
| Winner of third resource | 1 | 0 |
| Winner of fourth resource | 0 | 0 |

The ninth channel shown in table 11 contains information about the valuation realized by allocating the first, second, third and the fourth resources obtained by element-wise multiplication of the first and the eighth channel.

TABLE 11

|  | Entity 222 | Entity 224 |
|---|---|---|
| Valuation allocating first resource | 5 | 3 |
| Valuation allocating second resource | 4 | 0 |
| Valuation allocating third resource | 4 | 0 |
| Valuation allocating fourth resource | 0 | 0 |

In some implementations, the resources in a resource allocation mechanism can be bundled together as a single resource. For example, assume there are two different resources for sale in a resource allocation mechanism. The third resource can be both the resources together as a bundle. Input representations in such scenarios are explained below with reference to tables 12 to 19.

Table 12 represents a resource allocation mechanism between four entities and two different resources where each row represents the value or the utility of bundles of resource for each of the three entities. The $3^{rd}$ row represents that valuation of the first and second resource together.

TABLE 12

|  | Entity 1 | Entity 2 | Entity 3 | Entity 4 |
|---|---|---|---|---|
| Value of first resource | 10 | 8 | 6 | 15 |
| Value of second resource | 12 | 14 | 20 | 4 |
| Value of first and second resource | 30 | 32 | 26 | 25 |

As mentioned before, while computing the payment rule for a particular entity, the bids of other entities are used to generate an input representation. For example, table 13 represents the first channel when computing payment rule for entity 2 with valuations of entity 1 and 3.

TABLE 13

|  | Entity 1 | Entity 3 | Entity 4 |
|---|---|---|---|
| Value of first resource | 10 | 6 | 15 |
| Value of second resource | 12 | 20 | 4 |
| Value of first and second resource | 30 | 26 | 25 |

The second channel contains information regarding resource allocation using one hot encoding. The allocation is done based on bidding values of participants for the first resource and the second resource. Table 14 represents the second channel with one hot encoding showing entity 3 was allocated the second resource since the total sum of bids of the first and second resource by entity 4 and entity 3 is more than any bids for both resources combined and since the bid for the second resource by entity 3 is more than the bid for the first resource by entity 4.

TABLE 14

|  | Entity 1 | Entity 3 | Entity 4 |
|---|---|---|---|
| Value of first resource | 0 | 0 | 0 |
| Value of second resource | 0 | 1 | 0 |
| Value of first and second resource | 0 | 0 | 0 |

The third channel contains information regarding the valuation realized by allocation the most valuable bundle i.e. the second resource, obtained by element-wise multiplication of the first and the second channel. Table 15 represents the third channel.

TABLE 15

|  | Entity 1 | Entity 3 | Entity 4 |
|---|---|---|---|
| Value of first resource | 0 | 0 | 0 |
| Value of second resource | 0 | 20 | 0 |
| Value of first and second resource | 0 | 0 | 0 |

The fourth channel shown in table 16, represents the information regarding allocating the two most valuable bundles. The table shows that entity 4 was allocated the first and entity 3 was allocated the second resource.

TABLE 16

|  | Entity 1 | Entity 3 | Entity 4 |
|---|---|---|---|
| Winner of first resource | 0 | 0 | 1 |
| Winner of second resource | 0 | 1 | 0 |
| Winner of first and second resource | 0 | 0 | 0 |

The fifth channel shown in table 17 contains information about the valuation realized by allocating the two most valuable resources obtained by element-wise multiplication of the first and the fourth channel.

TABLE 17

|  | Entity 1 | Entity 3 | Entity 4 |
|---|---|---|---|
| Valuation of first resource | 0 | 0 | 15 |
| Valuation of second resource | 0 | 20 | 0 |
| Valuation of first and second resource | 0 | 0 | 0 |

The sixth channel shown in table 18, represents the information regarding allocation of the first, second and both first and second resource together. This channel is identical to the fourth channel shown in table 16 since both the first and the second resource have been allocated separately.

TABLE 18

|  | Entity 1 | Entity 3 | Entity 4 |
|---|---|---|---|
| Winner of first resource | 0 | 0 | 1 |
| Winner of second resource | 0 | 1 | 0 |
| Winner of first and second resource | 0 | 0 | 0 |

The seventh channel shown in table 19 is similar to the fifth channel since both the first and the second resource have been allocated separately resulting in no further allocation and the relative valuation.

TABLE 19

|  | Entity 1 | Entity 3 | Entity 4 |
|---|---|---|---|
| Valuation of first resource | 0 | 0 | 15 |
| Valuation of second resource | 0 | 20 | 0 |
| Valuation of first and second resource | 0 | 0 | 0 |

While computing the payment rule for a particular entity, the neural network 200 is configured to receive the input representation 210 to generate a network output 298. In some implementations, the neural network 200 includes one or more convolutional neural network layers layers configured to receive as input, the input representation 210 to generate a first per-entity representation of preferences of each of the other entities in the resource allocation mechanism. For example, while computing the payment rule for entity 223, the neural network 200 includes two convolutional layers 252 and 254. The first convolution layer 252 includes 64 filters of spatial dimension 1×1 and is configured to receive as input, the input representation 210, and generate as output, an embedding of each individual bid by other entities 222 and 224. The second convolution layer 254 includes 64 filters of dimension |K|+1 and is configured to receive as input the embedding of each individual bids to generate the first per-entity representation of preferences 260 and 262 of each of the other entities 222 and 224 respectively.

In some implementations, the neural network 200 may further comprise one or more neural network layers having a plurality of trainable parameters configured to receive as input the first per-entity representation of preferences of each of the other entities and generate as output, a second per-entity representation of preference of each of the other entities. For example, while computing the payment rule for entity 223, the neural network 200 includes a two neural network layers 265. The two neural network layers are configured to process each of the first per-entity representation and generate for each of the first per-entity representation, a second per-entity representation. For example, the two neural network layers 265 processes the first per-entity representation 260 of the entity 222 and generates the second per-entity representation 270. Similarly, the two neural network layers 265 processes the first per-entity representation 262 of the entity 224 and generates the second per-entity representation 272.

In some implementations, the neural network 200 further includes an element-wise sum-pooling operation 280 configured to receive as input the second per-entity representations. For example, the second per-entity representations 270 and 272 are pooled to generate a final entity representation 285.

In some implementations, the neural network 200 further includes one or more neural network layers with a relu activation functions that is configured to receive as input, the final entity representation. For example, the neural network 200 includes neural network layer 290 that is configured to receive as input the final entity representation 285 and generate as output the rule 298.

In some implementations, the training and testing dataset required for training the neural network includes multiple sample valuations of the resources in the resource allocation mechanism that are generated from the distribution based on the bids provided by the entities of the resource allocation mechanism. For example, suppose the resource allocation mechanism has 2 entities and 3 resources. The valuations of the resources are sampled from the following distribution for both entities: valuation for the first resource is uniform between $1 and $2, valuation for two resources is uniform between $2 and $4 and valuation for three resources is uniform between $4 and $5. In such a case, table 20 shows an example sample valuation of resource allocation mechanism resources.

TABLE 20

|  | Entity A | Entity B |
| --- | --- | --- |
| Bid for one resource | 1.2 | 1.7 |
| Bid for two resources | 2.8 | 3.4 |
| Bid for three resources | 4.1 | 4.7 |

In some implementations, training the neural network 200 requires iterating over the multiple sample valuations of the training set and adjusting the parameters of the neural network 200 to minimize the loss function given below $$h = \underset{h \in \mathcal{H}}{\arg\min} \sum_{l=1}^{L} \left( \sum_{i=1}^{n} t_i^l + \right.$$

-continued $$\left. \lambda_b \left( \min\left\{ \sum_{i=1}^{n} t_i^l, 0 \right\} \right)^2 + \lambda_r \sum_{i=1}^{n} \left( (\min\{v_i^l(k^*) - t_i^l, 0\})^2 \right) \right)$$

where $D=\{v_1^l, \ldots, v_n^l | 1, 2 \ldots L\}$ is the dataset of L realized n-entity profiles.

In some implementations, if the rule 298 is the payment rule, the payment rule can be used to compute the payment $t_i$ for the $i^{th}$ entity where the payment is computed for each entity in the resource allocation mechanism using the equation mentioned below.

$$t_i(\theta_{-i}, \theta_i) = h(\theta_{-i}) - \sum_{j \neq i} v_j(k^*(\theta_{-i}, \theta_i))$$

In some implementation, the neural network 200 is used to compute the redistribution rule where the redistribution rule is a function of valuations of resources provided by the entities in an resource allocation mechanism except for entity i. In such implementations, h is computed by subtracting the redistribution r from $h_{VCG}$. The payment $t_i$ for the $i^{th}$ entity where the payment is computed for each entity in the resource allocation mechanism is computed using the equation mentioned above.

Figure 3:
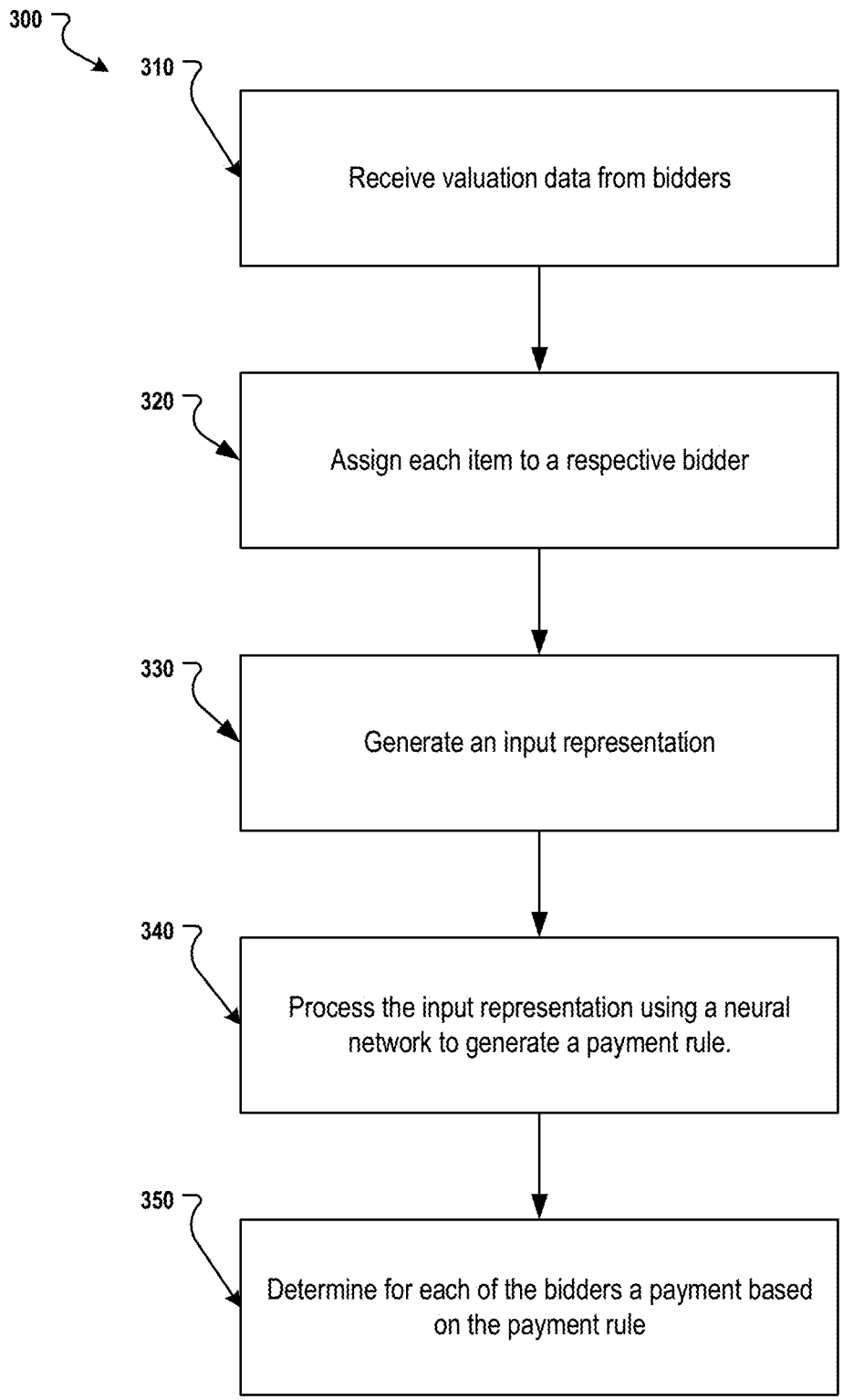
FIG. 3 is a flowchart of an example process for computing payment rule using the neural network.

FIG. 3 is a flowchart of an example process 300 that includes multiple steps for computing payment rule output for each entity. The process 300 is implemented in a computer system that includes one or more computers.

The system receives bids from the entities for the resources at a resource allocation mechanism (310). For example, the advertisement allocation apparatus 130 implements a resource allocation mechanism to allocate slots to advertisers. The advertisers based on their utility for the slots bid for the slots which is received by the advertisement allocation apparatus 130.

The system assigns resources to the entities based on the bids (320). For example, after receiving the bids from the advertisers for the advertisement slots, the resource allocation mechanism implemented by the advertisement allocation apparatus 130 allocates the resources according to an allocation rule $$c : \underset{k \in K}{\arg\max} \sum_{i}^{N} v_i(k) = k^*$$

where K consists of all possible ways to allocate the resources to the entities such that the allocation maximizes the sum of the total valuations of each allocated resources.

The system generates the input representation (330). For example, while computing the payment rule of each individual entity in the resource allocation mechanism, the bids of the other entities are used to generate the input representation. The input representation has dimensions |K|×n−1×2|K|+1 where K is the number of resources for resource allocation mechanism, n is the number of entities and 2|K|+1 is the number of channels based on the number of entities. For example, the input representation 210 for the case where there are three entities and four resources, the input representation has nine channels 211-219 where each channel 211-219 has a dimensions 2×4.

In some implementations, each channel is a matrix of dimension |K|×(n−1) that represents information available about other entity's valuations for the resources for resource allocation mechanism while remaining within the Groves family of mechanisms. In one implementation, the first channel may comprise all bids from all entities (except for the particular entity) and for all bundles of resources wherein a bundle refers to any proper subset of resources in a resource allocation mechanism. Subsequent channels may be viewed as |K| pairs where each pair has information regarding the proceeding bids for the resources. Within each pair comprising a first sub layer and a second sub layer, the first sub layer contains a one-hot encoding that represents resource allocation and the second sub layer contains the resulting realized valuation.

The system uses the neural network 200 to process the input representation and generate the payment rule for each entity (340). For example, the neural network 200 includes of two convolution layer 252 and 254. The first convolution layer 252 includes 64 filters of spatial dimension 1×1 and the second convolution layer 254 includes 64 filters of dimension |K|+1. The convolution layers 252 and 254 are configured to receive as input the input representation 210 and generate as output the first per entity representation of preferences 260 and 262 for entities 222 and 224 respectively.

The neural network 200 further includes two neural network layers 265 configured to process each of the first per-entity representation of preference 260 and 262 to generate a second per-entity representation 270 and 272 respectively. The neural network further includes an element-wise pooling operation 280 configured to process the second per entity representations 270 and 272 to generate the final per entity representation 285. The neural network 200 further includes a linear decoder with relu 290 that is configured to process the final per entity representation and generate as output the rule 298 for the entity 223. Depending upon the particular implementation, the rule 298 can be a payment rule or a redistribution rule.

The system determines the payment of each entity that was allocated one or more resources using the payment rule (350). If the rule 298 is a payment rule, the payment $t_i$ of each individual entity is computed using by substituting the value of $h_{-\theta}$ by the payment rule generated by the neural network 200 in the following equation $$t_i(\theta_{-i}, \theta_i) = h(\theta_{-i}) - \sum_{j \neq i} v_j(k^*(\theta_{-i}, \theta_i))$$

where $\theta_{-i}$ is the valuation of k resources submitted by all other participants except the $i^{th}$ entity, the allocation k can be defined as the mapping of each entity to a set of resources, k* is the optimal allocation of resources to the entities.

If the rule 298 is a redistribution rule, the payment rule is computed by subtracting the redistribution rule from $h_{VCG}$. Finally the payment $t_i$ of each individual entity is computed using the equation mentioned above.

Figure 4:
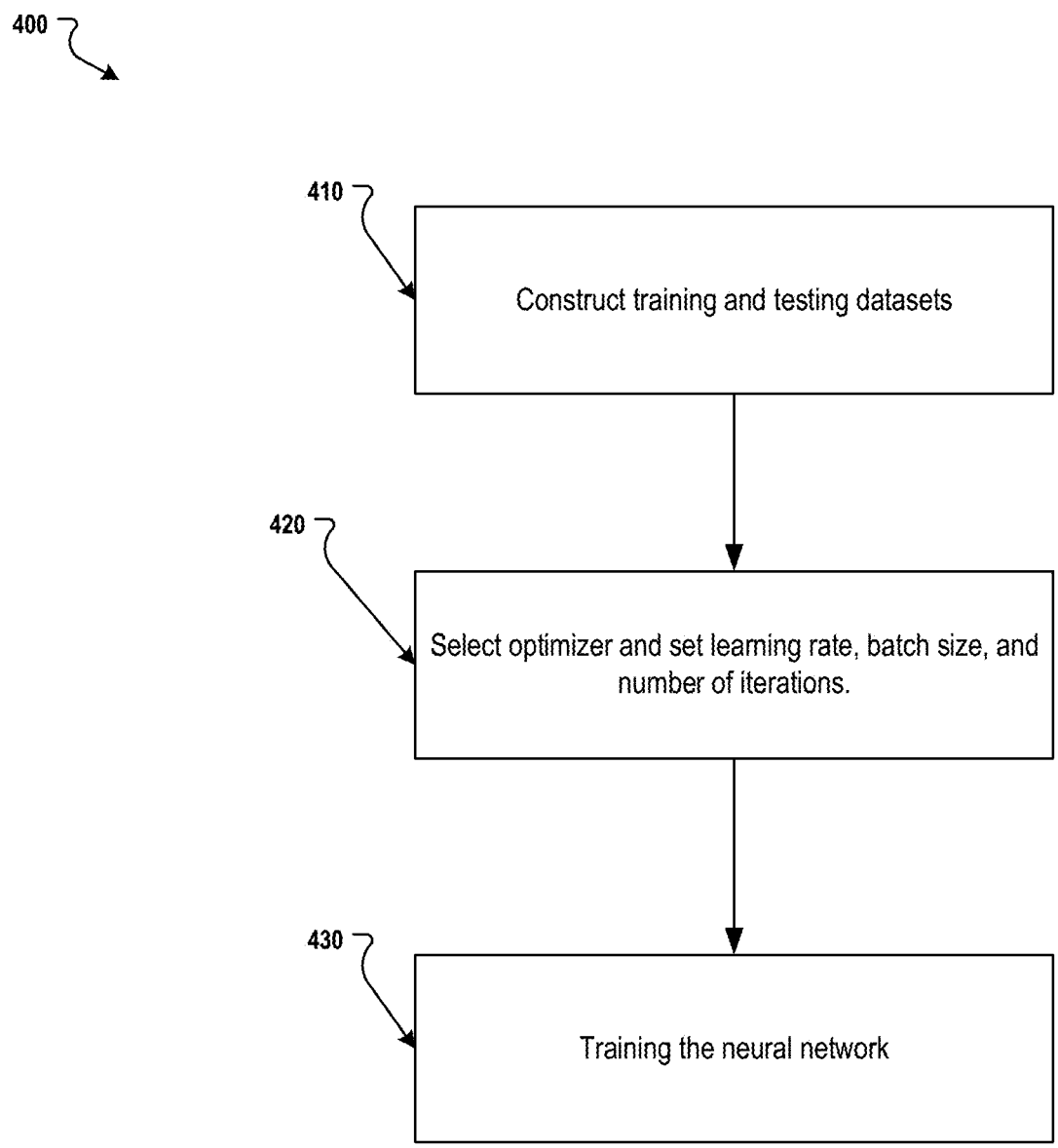
FIG. 4 is a flowchart of an example process for training the neural network.

FIG. 4 is a flowchart of an example process 400 for training the neural network 200.

The system 400 constructs the training and testing dataset of valuation profiles for all the entities in the resource allocation mechanism (410).

For example, as seen in table 20 a resource allocation mechanism has two entities bidding for three resources. The training and testing dataset of valuations are sampled from the distribution based on the bids provided by both the entities. Let us assume, the distribution of valuation for the first resource is uniform between $1 and $2, the valuation for two resources is uniform between $2 and $4 and valuation for three resources is uniform between $4 and $5. In such a case table 20 represents an example of a sampled valuation profile. Such sampling is performed multiple times to generate the samples of the training and testing dataset.

To train the neural network, the system selects an optimizer, a learning rate, batch size and the number of iterations (420). Examples of optimizers may include Adam SGD, RMSprop etc. In some implementations, the batch size can be set at 256, number of training iterations at 250,000 and the learning rate at $10^{-5}$.

The system iteratively trains the neural network 200 and adjusts the parameters of the neural network (430). For example, the neural network 200 requires iterating over the multiple sample valuations of the training set and adjusting the parameters of the neural network 200 to minimize the loss function given below $$h = \arg\min_{h \in \mathcal{H}} \sum_{l=1}^{L} \left( \sum_{i=1}^{n} t_i^l + \lambda_b \left( \min\left\{ \sum_{i=1}^{n} t_i^l, 0 \right\} \right)^2 + \lambda_r \sum_{i=1}^{n} \left( (\min\{v_i^l(k^*) - t_i^l, 0\})^2 \right) \right)$$

where D={$v_1^l, \ldots, v_n^l | 1, 2 \ldots L$} is the dataset of L realized n-entity profiles.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a standalone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network. In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers. Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method implemented by one or more programmable computers executing one or more instructions stored in one or more storage devices, comprising:
   receiving, by the one or more programmable computers, valuation data specifying, for each of a plurality of entities, a respective valuation for each of a plurality of resource subsets, each resource subset comprising a different combination of one or more resources of a plurality of resources;
   assigning, by the one or more programmable computers, each resource in the plurality of resources to a respective entity of the plurality of entities based on the valuations;
   generating, by the one or more programmable computers, for each particular entity of the plurality of entities, a respective input representation tensor that includes a plurality of channels with each channel being a matrix representing information of the valuations for the plurality of resource subsets from every other entity in the plurality of entities other than the particular entity, the plurality of channels including (i) a first channel that includes the respective valuations for the plurality of resource subsets from the every other entity, and (ii) a plurality of respective pairs of subsequent channels for each of a plurality of combinations of one or more resource subsets, wherein each pair of subsequent channels includes (a) an assignment channel that indicates which of the other entities is assigned the resource subsets in the combination when the valuations of the particular entity are not considered and (b) a utility channel that indicates a realized value to the other entities when the resource subsets in the combination are assigned without considering the valuations of the particular entity;
   processing, by the one or more programmable computers, for each particular entity of the plurality of entities, the input representation tensor including the matrices representing information of the valuations for the plurality of resource subsets from the every other entity using a convolutional neural network to generate a rule for the particular entity, wherein the rule generated by the neural network depends on the valuations of the resources by the every other entity, and the convolutional neural network is trained on sample valuations for the resources; and
   determining, by the one or more programmable computers, for each of the entities, a payment based on the rule output for the entities.

2. The method of claim 1, wherein the rule is a payment rule based on the reported types of entities and wherein determining, for each of the entities, a payment comprises: determining the payment based on the payment rule and on the optimal allocation of the resources.

3. The method of claim 1, wherein the rule is a redistribution rule based on the valuations of the resources by the entities wherein determining, for each of the entities, a payment comprises: determining a Vickrey-Clarke-Groves (VCG) payment for the entity and subtracting an output payment based on the rule from the VCG payment.

4. The method of claim 1, wherein the convolutional neural network includes one or more convolutional layers that are configured to process the input representation for the particular entity and to generate a first per-entity representation of preferences of each of the other entities.

5. The method of claim 4, wherein the convolutional neural network further includes one or more multi-layer perceptrons that are configured to process the first per-entity representation for the particular entity and to generate a second per-entity representation of preference of each of the other entities.

6. The method of claim 5, wherein the convolutional neural network further includes a sum-pooling operation configured to perform an element-wise summation of the second per-player representation of preference of each of the other entities to generate a final entity representation.

7. The method of claim 6, wherein the neural network includes a decoder configured to receive as input the final entity representation and generate as output the rule.

8. A system, comprising:
   one or more computers; and
   one or more storage devices storing instructions that when executed by the one or more computers, cause the one or more computers to perform:
     receiving valuation data specifying, for each of a plurality of entities, a respective valuation for each of a plurality of resource subsets, each resource subset comprising a different combination of one or more resources of a plurality of resources;

assigning each resource in the plurality of resources to a respective entity of the plurality of entities based on the valuations;

generating, for each particular entity of the plurality of entities, a respective input representation tensor that includes a plurality of channels with each channel being a matrix representing information of the valuations for the plurality of resource subsets from every other entity in the plurality of entities other than the particular entity, the plurality of channels including (i) a first channel that includes the respective valuations for the plurality of resource subsets from the every other entity, and (ii) a plurality of respective pairs of subsequent channels for each of a plurality of combinations of one or more resource subsets, wherein each pair of subsequent channels includes (a) an assignment channel that indicates which of the other entities is assigned the resource subsets in the combination when the valuations of the particular entity are not considered and (b) a utility channel that indicates a realized value to the other entities when the resource subsets in the combination are assigned without considering the valuations of the particular entity;

processing, for each particular entity of the plurality of entities, the input representation tensor including the matrices representing information of the valuations for the plurality of resource subsets from the every other entity using a convolutional neural network to generate a rule for the particular entity, wherein the rule generated by the neural network depends on the valuations of the resources by the every other entity, and the convolutional neural network is trained on sample valuations for the resources; and determining, for each of the entities, a payment based on the rule output for the entities.

9. The system of claim 8, wherein the rule is a payment rule based on the reported types of entities and wherein determining, for each of the entities, a payment comprises: determining the payment based on the payment rule and on the optimal allocation of the resources.

10. The system of claim 8, wherein the rule is a redistribution rule based on the valuations of the resources by the entities wherein determining, for each of the entities, a payment comprises: determining a Vickrey-Clarke-Groves (VCG) payment for the entity and subtracting an output payment based on the rule from the VCG payment.

11. A non-transitory computer readable medium storing instructions that, when executed by one or more data processing apparatus, cause the one or more data processing apparatus to perform operations comprising:

receiving valuation data specifying, for each of a plurality of entities, a respective valuation for each of a plurality of resource subsets, each resource subset comprising a different combination of one or more resources of a plurality of resources;

assigning each resource in the plurality of resources to a respective entity of the plurality of entities based on the valuations;

generating, for each particular entity of the plurality of entities, a respective input representation tensor that includes a plurality of channels with each channel being a matrix representing information of the valuations for the plurality of resource subsets from every other entity in the plurality of entities other than the particular entity, the plurality of channels including (i) a first channel that includes the respective valuations for the plurality of resource subsets from the every other entity, and (ii) a plurality of respective pairs of subsequent channels for each of a plurality of combinations of one or more resource subsets, wherein each pair of subsequent channels includes (a) an assignment channel that indicates which of the other entities is assigned the resource subsets in the combination when the valuations of the particular entity are not considered and (b) a utility channel that indicates a realized value to the other entities when the resource subsets in the combination are assigned without considering the valuations of the particular entity;

processing, for each particular entity of the plurality of entities, the input representation tensor including the matrices representing information of the valuations for the plurality of resource subsets from the every other entity using a convolutional neural network to generate a rule output for the particular entity, wherein the rule output generated by the neural network depends on the valuations of the resources by the every other entity, and the convolutional neural network is trained on sample valuations for the resources; and determining, for each of the entities, a payment based on the rule output for the entities.

* * * * *